US005628541A

United States Patent [19]
Gardner

[11] Patent Number: 5,628,541
[45] Date of Patent: May 13, 1997

[54] EXPANDABLE COACH HAVING AT LEAST ONE EXPANSION CHAMBER

[75] Inventor: Stewart Gardner, Bristol, Ind.

[73] Assignee: R-N-R International, Inc., Bristol, Ind.

[21] Appl. No.: 375,594

[22] Filed: Jan. 19, 1995

[51] Int. Cl.$^6$ ...................................................... B60P 3/34
[52] U.S. Cl. .......................... 296/26; 296/165; 296/171; 296/175
[58] Field of Search ................................ 296/26, 27, 165, 296/171, 172, 175, 176; 52/67

[56] References Cited

U.S. PATENT DOCUMENTS

| 2,886,856 | 5/1959 | Che .......................................... 296/171 |
| 2,995,398 | 8/1961 | Davenport ............................... 296/171 |
| 3,271,065 | 9/1966 | Scuris ....................................... 296/26 |
| 4,133,571 | 1/1979 | Fillios ...................................... 296/26 |
| 4,513,670 | 4/1985 | Berman .................................... 52/67 |

*Primary Examiner*—Dean Kramer
*Attorney, Agent, or Firm*—Mark C. Jacobs

[57] ABSTRACT

A coach, having an interior living space, which coach has at least one and no more than two expansion chambers. Each expansion chamber is formed as a box having top, side and bottom walls and one rear or front wall. The coach may be a trailer, an RV body disposed upon a truck chassis, or a recreational vehicle having a self-contained propulsion system. The coach may have instead of wheels as a support system, a series of vertical jacks or other support mechanism to thereby render the coach suitable for use as an office or an industrial facility. The coach features a spaced inner and outer wall construction and which may have no closing wall at the position at which the chamber is disposed. The chamber is adapted such that its sidewalls when in the retracted position are disposed between the inner and outer sidewalls of the living space. The expansion chamber sidewalls move from their respective first stowed inner disposition between the inner and outer wall rearwardly or forwardly depending upon the disposition of the expansion chamber to a second outer expanded position; and the top and bottom walls move from a stowed disposition beneath the top wall and beneath the floor of the living space respectively to a second outer expanded position. For support of the expanded chamber, a pair of deployable rails are moved from a stowed position to an in-use position, cantilevered from beneath the body of the living space to support the expansion chamber.

42 Claims, 9 Drawing Sheets

EXPANDABLE COACH HAVING AT LEAST ONE EXPANSION CHAMBER

FIELD OF THE INVENTION

This invention relates to recreational vehicle coaches, both motorized and towable, and other habitat bodies having a spaced inner and outer wall construction of a fixed cubic capacity, and which are expandable to an enlarged cubic capacity.

BACKGROUND OF THE INVENTION

Persons who own motor coaches are people, and people want more living space in their coaches when arriving at a destination, yet they want to be able to travel in a compact coach which is safer and easier to maneuver. In various RV vehicles attempts have been made over the years to increase the living space available to the occupants. We are all familiar with the pop-top campers offered in the past and still today by Volkswagen Motors. In these units, the top expanded upwardly, but the volume of the body between the two sides, front and rear stayed the same.

Indeed other attempts have been made over the years to increase the living space available for use, none of them commercially successful. For example, campers have been made with side mounted awnings and other raisable coverings for a porch area. As the result of a patent search, Applicant is familiar with the following U.S. Patents which date back to 1900.

| U.S. Pat. No. | Applicant | Issue Date |
|---|---|---|
| 642,991 | Macfee | February 6, 1900 |
| 3,212,810 | Bass | October 19, 1965 |
| 3,740,088 | Ratcliff | June 19, 1973 |
| 3,833,954 | Daughenbaugh | September 10, 1974 |
| 3,915,492 | Agnese | October 28, 1975 |
| 4,017,116 | Hulsey | April 12, 1977 |
| 4,106,732 | Whiting | August 15, 1978 |
| 4,114,942 | Greiner | September 19, 1978 |
| 4,133,571 | Fillios | January 9, 1979 |
| 4,295,679 | Artweger | October 20, 1981 |
| 5,127,697 | St. Marie | July 7, 1992 |
| 5,154,469 | Morrow | October 13, 1992 |

The invention of this application is neither disclosed in any of the above patents nor is the invention rendered obvious from any combination of these references.

Therefore, one object of this invention is to provide a new coach having at least one expansion chamber.

It is another object to provide a coach having an expansion chamber that provides additional living space interiorly in the coach.

It is yet another object of this invention to provide a coach with an expansion chamber which when in the stowed position cannot be seen.

It is still another object to provide a coach with an expansion chamber that is supported by members associated with and carried by the coach.

It is a further object to provide a coach with an expansion chamber whose side windows, if any, are juxtaposed positionally with the side windows of the main body of the coach.

It is a still further object to provide a coach with an expansion chamber that can be easily moved from a stowed first position to an operative second position by a person who lacks a high degree of mechanical skill.

It is an additional object to provide a coach which can be expanded to provide additional living space, and which coach can be used unexpanded, either in a stationary supported position or as a moving vehicle.

Yet another object is to avoid the criticality of perfectly parallel telescoping members for the deployment of the expansion chamber.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A coach, motorized or not, wheeled or not, having an interior living space, and which coach has at least one and no more than two expansion chambers. Each of the expansion chambers comprises an open sided box having top, side and bottom walls and one rear or front wall.

The coach features a living space which has fixed upstanding inner sidewalls and a base, and which preferably has no closing wall at the front and/or rear position at which the respective expansion chamber is disposed. The expansion chamber is constructed such that its sidewalls when in the retracted position are disposed between the fixed inner wall of the living space and the main body fixed outer sidewalls of the living space.

In order to move to its expanded, or outer position, the expansion chamber sidewalls move from their respective first stowed intermediate disposition between the inner and outer wall sidewall construction of the living space rearwardly or forwardly—depending upon the disposition of the expansion chamber relative to the living space—to a second expanded outer in-use position. Correspondingly the top and bottom walls move from a stowed disposition interiorly of the main body for the top wall and beneath the floor of the living space for the bottom wall respectively, to a second expanded outer in-use position linearly to the rear or forwardly of the living space.

For support of said chamber, when it is in the outer position, a pair of deployable rails are moved from a stowed position to a deployed in-use position, cantilevered from beneath the body of the living space to support the expansion chamber.

DESCRIPTION OF THE PREFERRED EMBODIMENT

Figure 1:
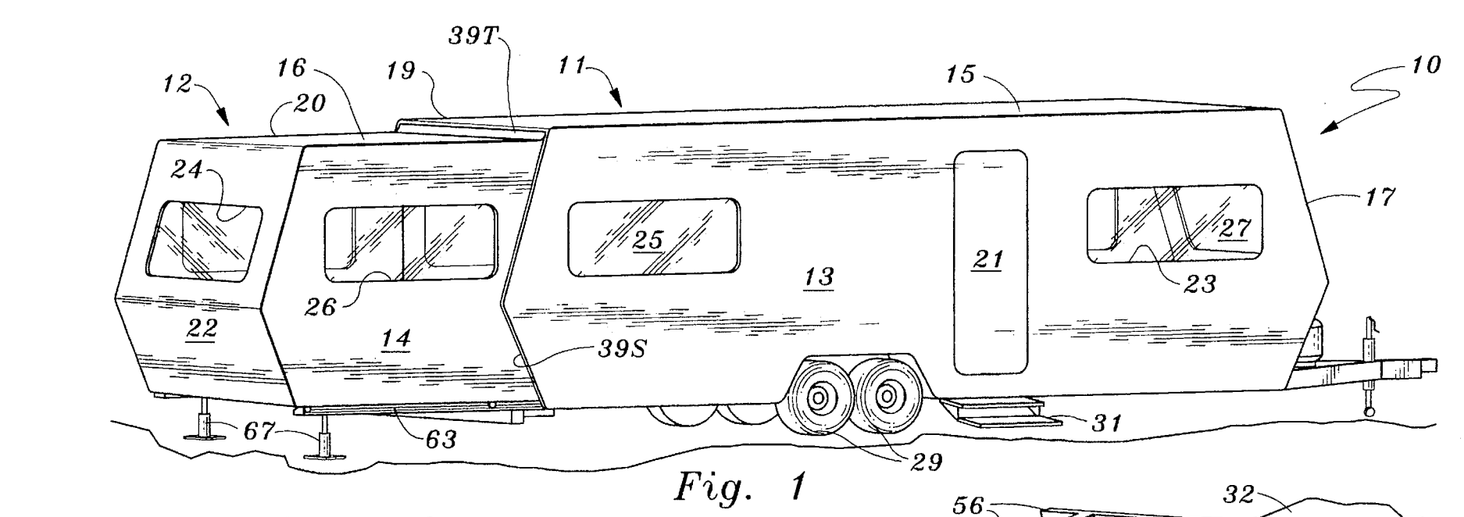
FIG. 1 is a perspective view of the expandable motor coach of this invention with the expansion chamber in extended position.

Let us turn first to FIG. 1. Here the expandable coach 10 is seen in a rear perspective view in its expanded state, i.e., with the expansion chamber 12 extended rearwardly from the main body 11. The reader's attention is also directed to FIG. 12 which is a front perspective view of the coach but with the expansion chamber 12 in the retracted position. Prior to discussing the details of the expansion chamber, and its operation, a brief time will be spent in the discussion on the actual coach itself and the mode of construction utilized to accommodate the movable chamber.

The coach 10, is seen to have a main body 11 comprised of a left outer sidewall 13, a top wall 15 and a right outer sidewall 19. See also FIGS. 17 and 18. If the coach is a self-propelled, i.e., it has a motor, or if it is a towable coach with only one expansion chamber at the rear, the front wall 17, will be attached to the main body 11 as in FIG. 12. If the front section is also to be expandable, then the front wall is part of the forward expansion chamber. For ease and convenience the discussion herein will be limited to a coach having but one expansion chamber; namely, in the rearward area of the coach. However, if a coach had a forward expansion chamber as well or in place of a rearward expansion chamber, the discussion would be equally applicable.

Figure 12:
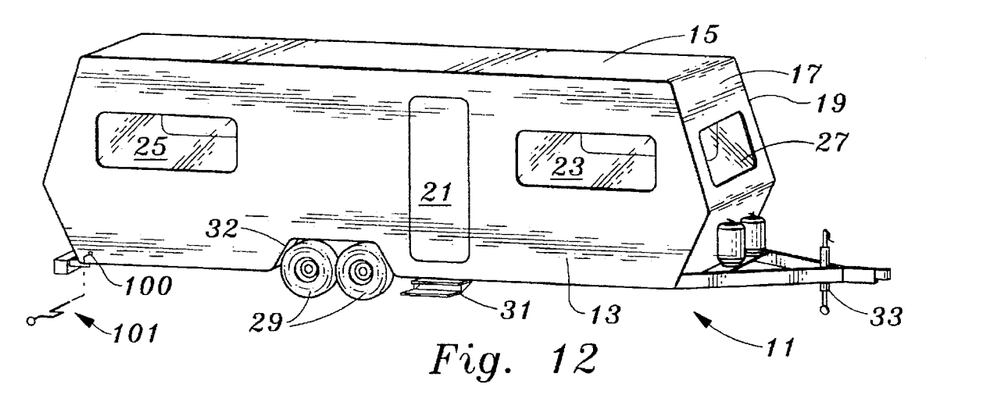
FIG. 12 is a right elevation of a closed coach according to this invention.

Thus in FIG. 12, it is seen that front wall 17 having a front window 27 is attached to the two aforementioned outer sidewalls 13 and 19 and to the top wall 15. Outer sidewall 13 includes a forward window 23 and a rearward window 25. Similar or different window placement will be found in the unseen outer right sidewall 19. At least one door such as door 21 in the left sidewall as viewed from the front of the coach is found disposed conventionally in sidewall 13. All of the doors and windows are conventional and no criticality is to be attached to their shape or location. Coach 10 has no rear wall as the rear wall forms part of the expansion chamber as is seen in FIG. 1.

The main body 11 also is seen to include at least one set of retractable conventional steps 31, as well as two axles carrying wheels and tires 29, also of a conventional nature. Each pair of tires of said wheeled axles are covered over by a fender 32 as is customary in the art.

Expansion chamber 12 includes a left sidewall 14, in which is a window 26, a rear wall 22 having a window 24, and a right sidewall 20, which right sidewall may also have a window. All windows in the expansion chamber are conventional windows. For cosmetic purposes, all sidewall windows in the expansion chamber correspond in size and relative placement to be aligned with the rearwardly disposed sidewall windows of the main body 11, when the expansion chamber is in the retracted or stowed position. Contrast FIG. 1 and FIG. 12. Also seen in FIG. 1, are the special jacks 67 used to support the cantilevered deployed rails, 63, both of which elements will be discussed in detail below.

Figure 2:
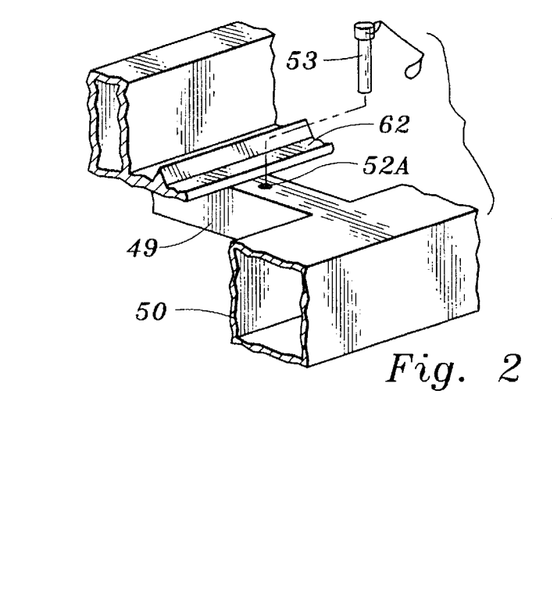
FIG. 2 is a perspective view of a portion of this invention.
Figure 3:
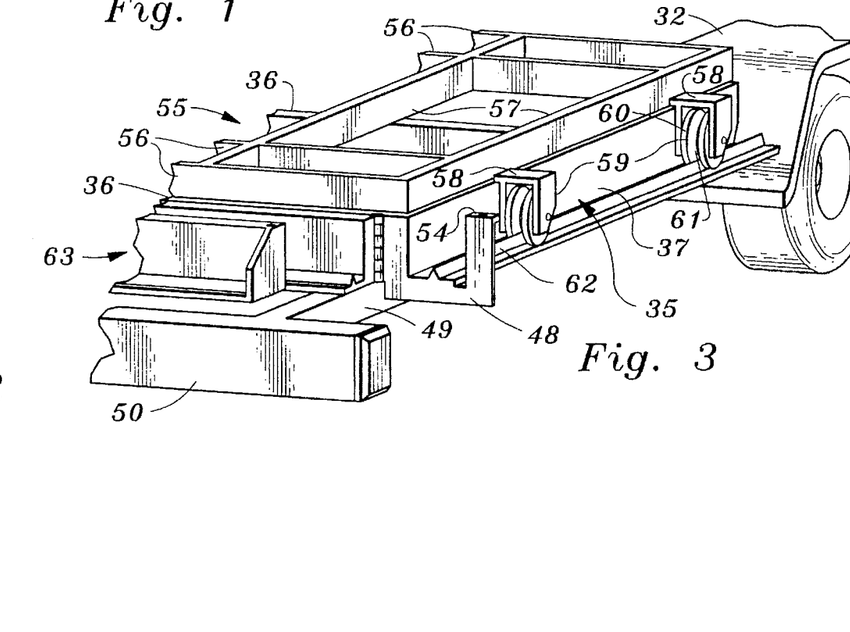
FIG. 3 is a perspective view of the movable superstructure chassis which forms part of this invention.
Figure 4:
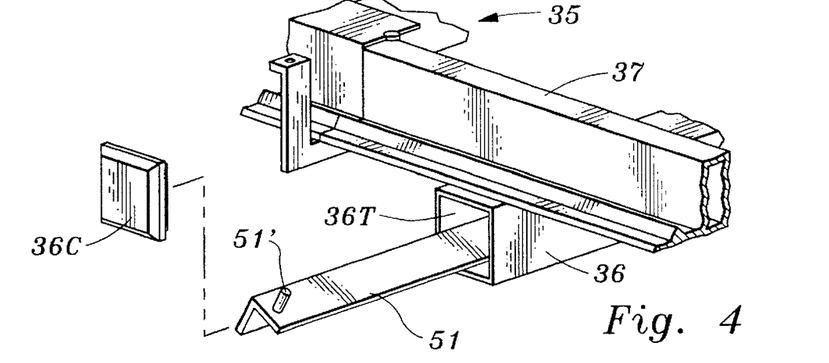
FIG. 4 is a perspective view of a retaining member employed in this invention and the mode of stowing same.

The discussion now turns to FIGS. 2 through 10 inclusive, which illustrate the superstructure upon which the coach is built. The reader is directed to FIGS. 2, 3 and 4. In FIG. 4 there is seen a retention bar 51 which is stowed during periods of travel in structural tubular member 36T. Tubular member 36T is closed off by friction fitting cap 36C. This retention member 51, which is configured as an L-beam, includes at least a pair of spaced downward extending pins 51" (FIG. 4) which engage into suitably aligned bores 50B (FIG. 5) in the top surface of rear bumper 50 when retention rail 51 is disposed upon the rear bumper 50. Alternatively a pair of holes similar to 50B could be placed in the pair of bumper mount rails 49, one of which is seen in FIG. 2 disposed normal to rear bumper 50 for disposition of retention bar 51 parallel to said rear bumper for the same purpose. Thus it is seen that retention bar 51 is used to retain the deployable rails 63 in place, such that they do not move from their secured for use position in a parallel relationship spaced behind the coach body.

FIG. 2 is a close-up view showing the disposition of a means of retaining the deployable rails 63 in their stowed position. At least one of the deployable rails, 63 per FIG. 2 includes a bore 52A which communicates with an aligned bore 52 in the bumper mount rail 49, through which holes is placed a lock pin 53 to releasably secure the two deployable rails to the bumper mount rail 49. The one deployable rail that requires the presence of the bore 52A is the rail that in stowed position is the second rail to be stowed, i.e., the most rearward or most forward of the two stowed rails depending on the location of the expansion chamber, be it front positioned or rear positioned. The purpose of the lock pin is to retain the deployable rails in the closed or stowed position during travel.

FIG. 3 is a perspective view of the superstructure of the apparatus of this invention. The superstructure consists of two chassis, an expansion chassis 55, and a main body chassis 35, the latter of which has a series of spaced crossmembers 36 connected in a conventional manner, as by welding, in a disposition normal to the spaced longitudinal side members 37. At both the lead end and the tail end and of the main body chassis, on both the right and left sides thereof, an L-shaped caster rail carrier bracket is welded or otherwise mounted extending outward from said side members 37. Each caster rail carrier bracket has an apertured body mount plate 54 horizontally disposed thereon. The caster rail carriers retain the front or fixed caster rails 62, whose purpose will be discussed infra.

The expansion chassis 55, for the expansion chamber is carried by the main body chassis and is configured as a rectangle having front, rear and intermediate cross members 56, as seen best in FIG. 3, connected to spaced longitudinal members 57 in a conventional manner. Attached to each of the outer longitudinal members 57 and extending outwardly therefrom is a caster carrier 58, at both the forward and rearward ends of said chassis. These four caster carriers 58 each carry a single V-groove caster 59, having a caster wheel 60. Disposed between each of the two halves of the wheel 60 is a V-groove, 61. The V-groove is adapted to engage the A-shaped configuration of the caster rails.

It is preferred that the crossmembers 36 of the main body chassis include one box tube 36T among their number. See FIG. 4. When such provision is made, one can store the retention rail 51 within the confines of the box tube 36T during such times as the expansion chamber is retracted and deployable rails 63 are in stowed positions. A conventional cap or lock pin, not shown, keeps the retention rail 51 in place during travel.

Figure 5:
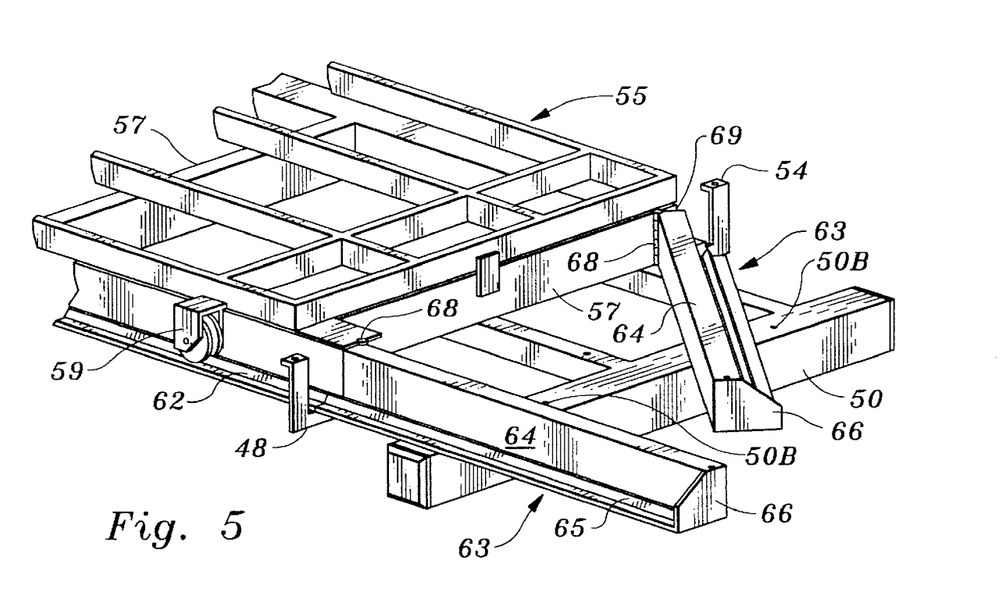
FIG. 5 is a rear perspective view illustrating the disposition of the swing arms used in this invention into their operative position.

FIG. 5, depicts the deployment of the two deployable rails 63. This figure was based upon photography taken during the construction stage of this invention, prior to the placement of the main body upon its chassis. One such rail 63 is shown already in its deployed position, while the second one is shown at a point in time during its rotation from the first stowed transverse position to the second extended elongated position. Each deployable rail 63 is pivotally mounted at its proximal end-to a side member, 37, or perhaps to the rear cross member depending on the nature of the hardware employed, by conventional hinges, such as door hinges 68 visible in FIG. 5.

Each rail 63 includes a support bar 64, from which an extending outwardly along the length thereof and welded thereto is an outer caster rail, 65. This caster rail 65 is designated the rear caster rail, because it is deployed out from the body of the apparatus 10, and because it is disposed rearward of the front caster rail 62.

While a pivoting disposition is herein described for the deployment of each of the two rails, 63 it is to be appreciated that a linearly extendible and retractable disposition with a swing hinge to outwardly dispose said rail for proper positioning in alignment with front caster rail 62 is also contemplated by this invention. This second mode, while contemplated would be significantly higher in cost, and could lead to alignment difficulties.

Figures 7, 8:
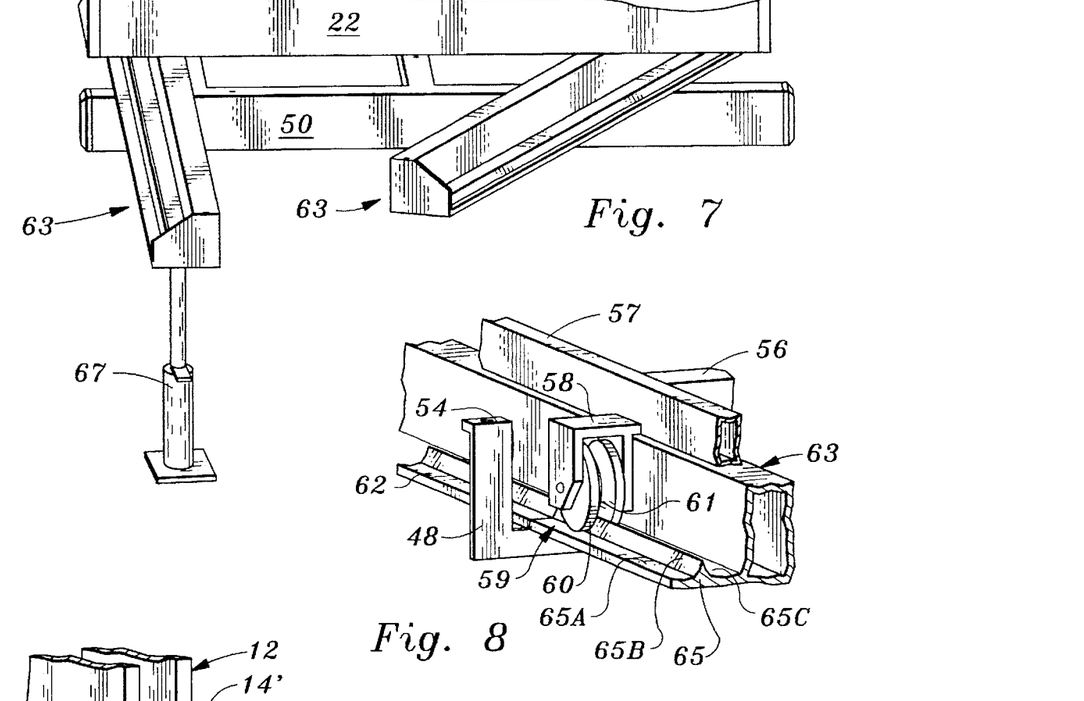
FIG. 7 is a view similar to FIG. 4 but showing the swing arms moving into extended disposition for a full sized model unit.
FIG. 8 is a close-up of a portion of this invention.

Each caster rail 65 is configured the same in cross section as the front caster rail 62. That is, as shown in FIG. 8, a first flat caster receiving exterior surface 65A is separated from a second caster receiving interior surface 65C by an inverted V portion 65B which engages the V-groove 61 between the segments of wheels 60 of the caster 59 which itself is disposed within the caster carrier 58. Also seen in FIG. 8 is one of the body mount plates 54 to which the main body of the coach is attached. The actual mode of attachment of the coach body to the body mount plates is the conventional mode used throughout the industry, and therefore it is not necessary to discuss such mode at length, as it is not germane to the instant invention.

Figure 6:
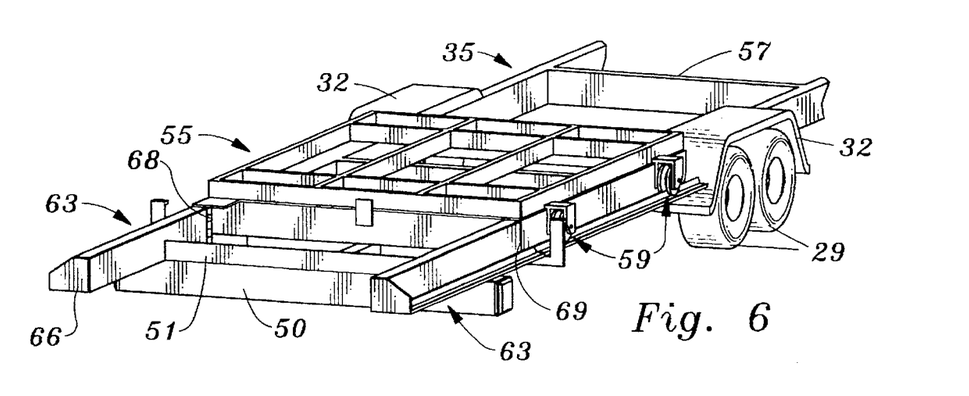
FIG. 6 is a rear perspective view of the base and superstructure chassis used in this invention with the swing arms deployed.

While FIGS. 4, 5 and 6 show the disposition of the deployable rails relative to the expansion chassis only 55, in FIG. 7, one rail is seen fully deployed and the other rail in process of deployment relative to the rear wall 22 of the expansion chamber 12. The fully deployed rail 63 is being supported for safety sake upon special jack 67, more about which will be recited infra with respect to another figure.

Figure 9:
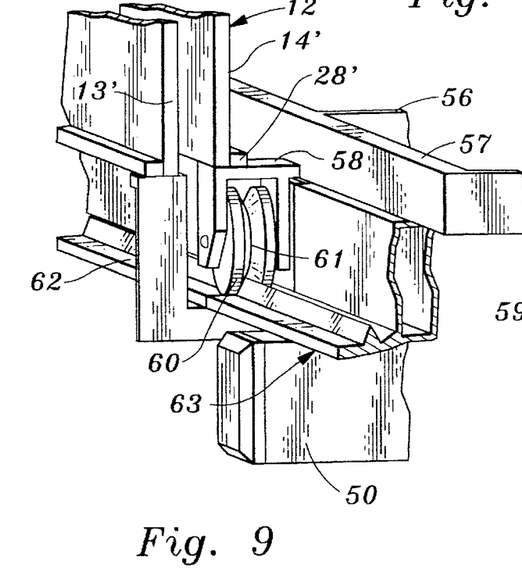
FIG. 9 is a perspective view that illustrates graphically the movement of the wall construction employed in this invention.

In FIG. 9, the mode of construction employed is diagrammatically depicted. Here the side outer wall 13' is shown in relative disposition to the side wall 14' of the expansion chamber unit, 12. This expansion chamber's wall is seen to be disposed upon a segment of bottom wall 28' which is resting on caster carrier 58 of FIG. 8. See also FIG. 17. Here also a coach wheel 60 and one of the caster rails 62 are also shown. Thus it can be appreciated how the sidewall of the expansion chamber is spaced from the sidewall of the main body and is able to move rearwardly relative thereto.

Figure 10:
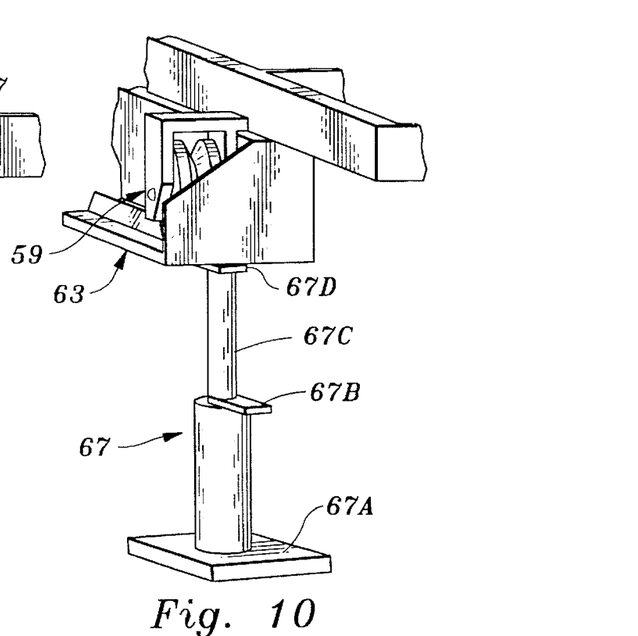
FIG. 10 is a perspective view of a support jack used in connection with this invention.

The discussion now moves to FIG. 10 wherein the special jack 67 is shown. Jack 67 includes a conventional base 67A, a throat portion having a conventional ratcheting section therein 67B, an elevateable portion 67C and a plate 67D for supporting the end of the deployable rail. The purpose of the jack is to ensure that the cantilevered rails 63 do not deflect downward due to the weight thereon when the expansion chamber is in its outward disposition for use.

Figure 11:
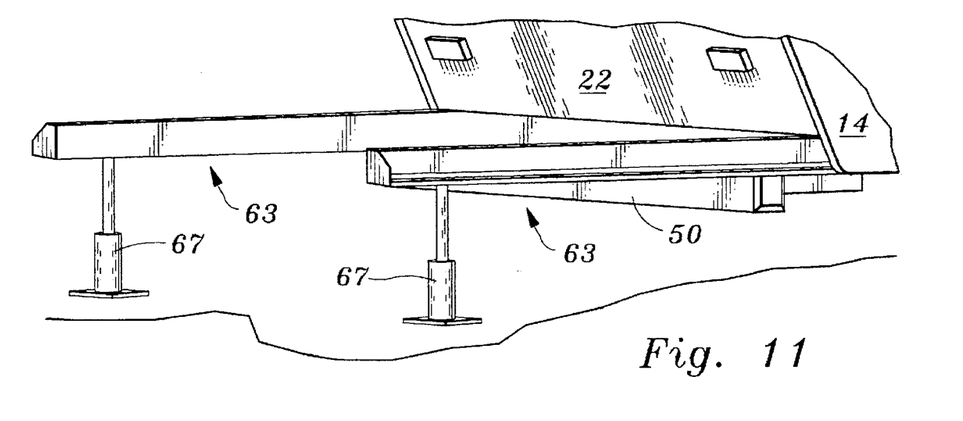
FIG. 11 is a perspective view showing the swing arms of a coach according to this invention in extended position.

FIG. 11 also illustrates the point in time when the expansion chamber, whose rear wall 22 and one sidewall 14 are shown, is ready to move rearwardly into position for use. The two deployable rails 63 are shown extended and supported by said jacks 67.

The reader's attention is now directed to FIGS. 12, 13, 14, 15, and 16. In FIG. 12, a full size coach having only a rear expansion chamber is depicted. FIG. 12 shows the coach 11 in a non-expanded condition. All of the individual elements have been previously called out, but for the conventional tongue and front wheel assembly 33. The opening 100 is the insertion point for hand crank 101 shown lying on the ground.

Figure 13:
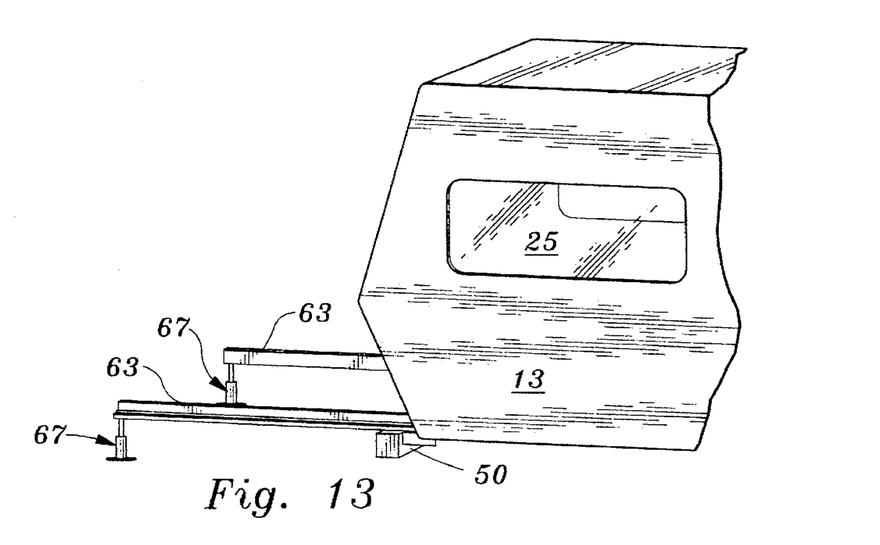
FIG. 13 is a right rear elevation of a coach according to this invention, prior to extension of the expansion chamber.

FIG. 13 is a close-up view of the rear of the coach seen in FIG. 12, wherein the deployable rails have in fact been deployed.

Figure 14:
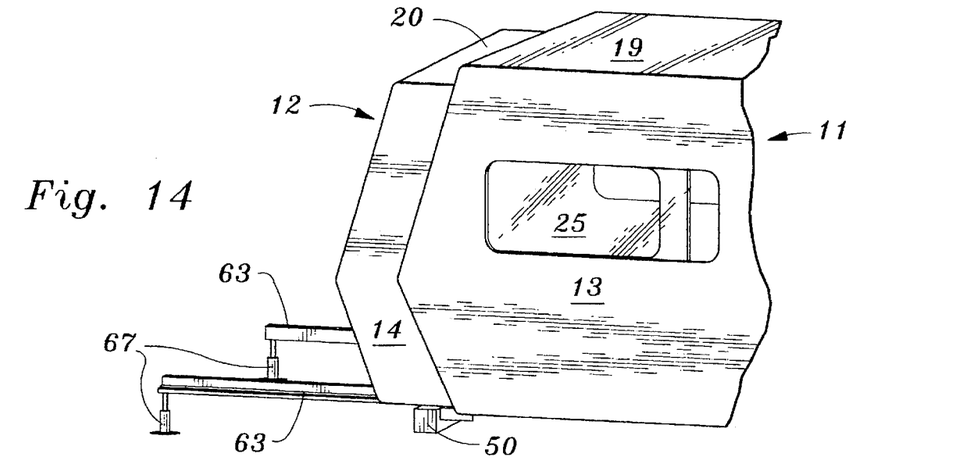
FIGS. 14, 15 and 16 are stop action photos of the coach shown in FIG. 13, at different points in time during the deployment of the expansion chamber in accordance with this invention.

FIG. 14 is a first point in time wherein the expansion chamber is seen to be moving rearwardly out from its retracted position. Note the visible width of that area of sidewall 14 of the expansion chamber 12.

Figure 15:
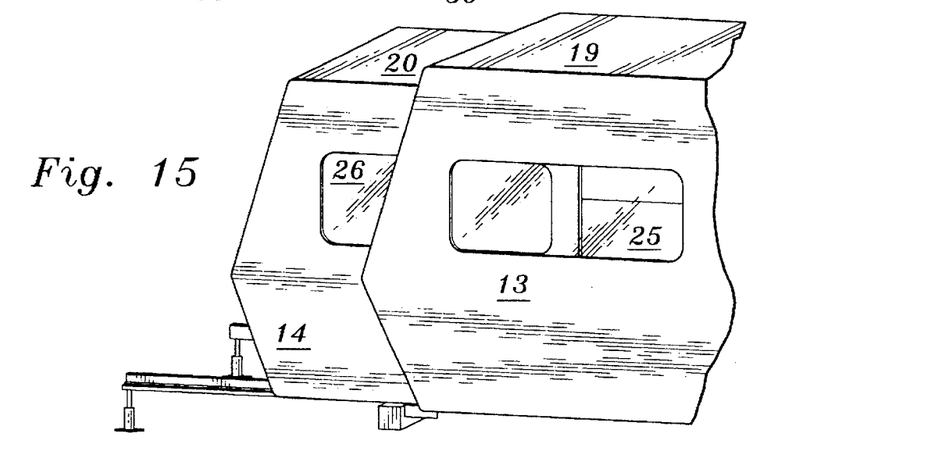

In FIG. 15, at a next finite point in time, more of said sidewall 14 is visible. Also seen is window 26 which is sized identically to window 25 and is placed for alignment both vertically and horizontally, when the chamber 12 is in the stowed position. Note how as the expansion chamber moves rearwardly, more and more of it is supported on the aforementioned deployable rails.

Figure 16:
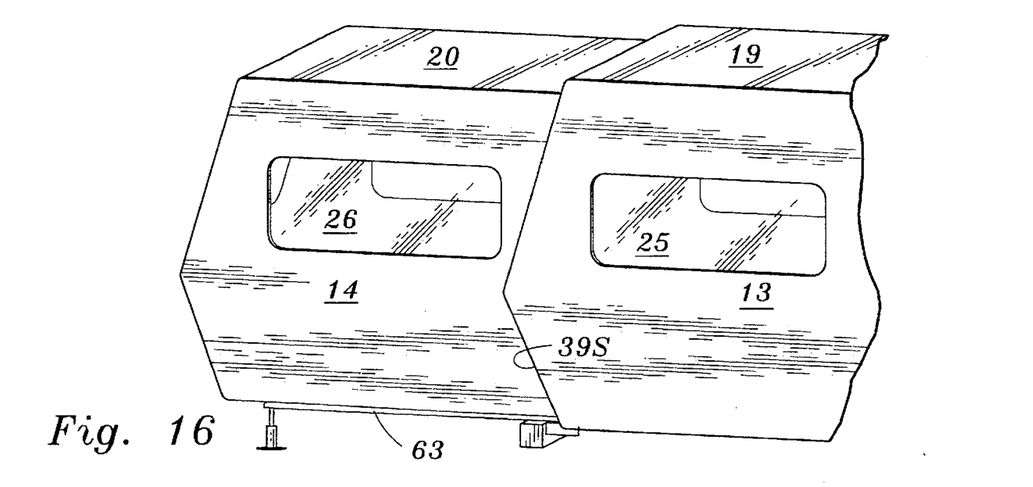

Finally in FIG. 16, the entire expansion chassis has moved outwardly. See the discussion to follow, concerning FIG. 24 for the mechanism to relocate the expansion chamber.

Figure 24:
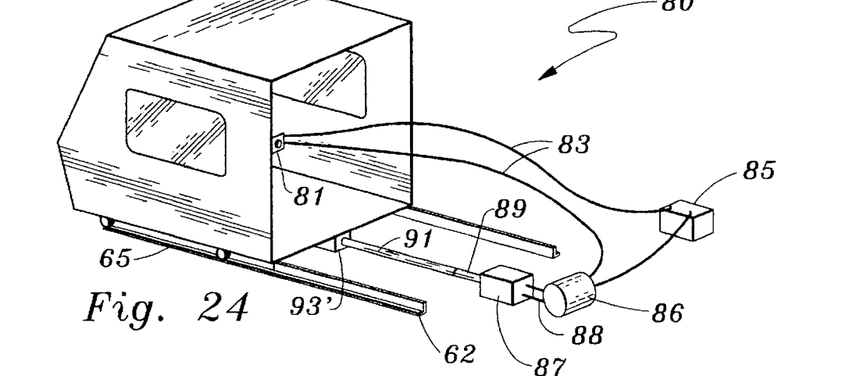
FIG. 24 is a diagrammatic view which shows the motor and associated mechanical parts to move the expansion chamber from a stowed to an expanded position and back to a stowed position.

Reference is now made to FIG. 24. There is shown a combination diagrammatic view and wiring diagram, the combination being designated 80. Reversing switch 81 preferably conveniently mounted on one side of the coach main body such as 13 as is shown, is electrically connected by wiring 83 to both battery 85 and motor 86. Motor 86 is secured in a conventional fashion to the frame as is known in the art. Motor 85 is electrically connected by wiring 88 to ram housing 87. From the ram housing 87 extends a fixed main ram 89 having an extension and movable portion 91 connected thereto. The extension portion has its distal end secured to an attachment mount 93 on the forward underside of the expansion chamber 12. Such rams are well known in the art as are the means for activating them. Switch 81 is designated a reversing switch, because associated therewith is any other electronics needed but not shown, to reverse the operational direction of the motor that controls the operation of the ram to cause the expansion chamber to retract into the closed position. Over expansion and over retraction are prevented by setting certain adjustments on the ram. It is well within the skill of the art to set the ram for correct operation. Therefore no barrier stops are needed to prevent over travel in either direction by the expansion chamber.

The reader recognizes that artistic license has been taken with respect to the actual position of wiring 83. In point of fact wiring 83 is buried either in conduit or between the outside wall and the inside wall, just as in a wood home and then extends down along the chassis to the battery and motor 85 and 86 respectively.

Figure 17:
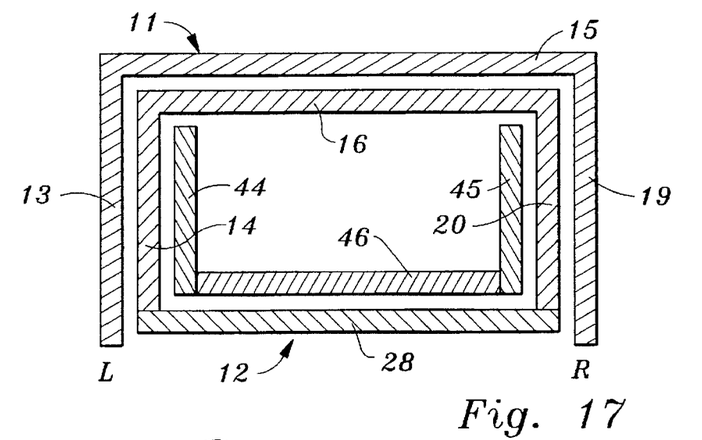
FIG. 17 is a diagrammatic sectional view illustrating the three wall construction employed with this invention.

In order to understand, the mode of construction that permits the rearward movement of a rear expansion chamber and the forward movement of a front expansion chamber, reference should now be made to sectional end view, FIG. 17. It shows, in a diagrammatic representation, the various walls employed in the main body and the expansion chamber and their relative disposition to each other. Here main body 11 in an inverted U shape configuration, and having the two outer sidewalls 13, 19 and top wall 15 is shown as the outermost and topmost walls respectively. As one moves inwardly, it is seen that the intermediate structure is the generally rectangular in cross section expansion chamber 12 of a generally U-shaped construction with its two sidewalls 14, and 20 and its top wall 16 and bottom wall, 28. The sidewalls 13, 20 are disposed adjacent to and spaced slightly from the outer main body's exterior side walls. The innermost structure is the interior wall system of the main body of the coach. It is configured as U-shaped member with spaced sidewalls 44, 45, designated as inner sidewalls each connected to a bottom wall 46. This view gives the reader a greater appreciation of the locus of the various structures that make up this invention. Thus the chamber's sidewalls are seen to be intermediate of and spaced from the outer and inner sidewalls of the main body.

Figure 18:
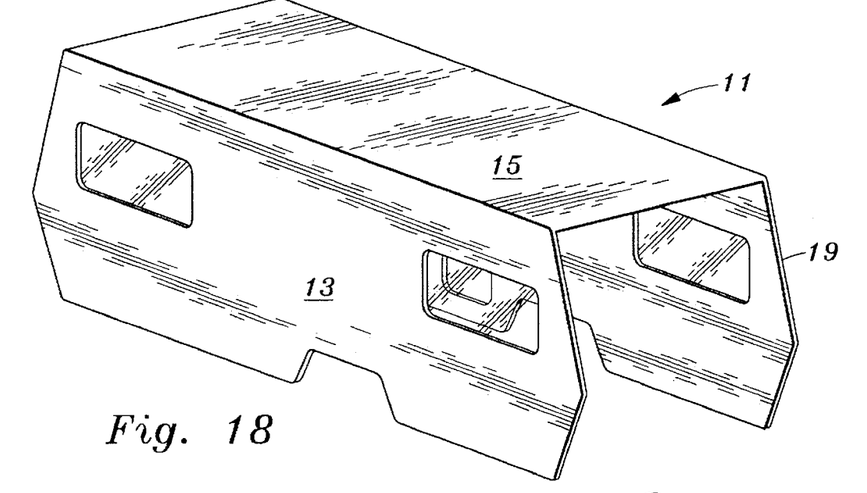
FIG. 18 is a top perspective view of the main shell of this invention.

FIG. 18 is a top perspective view of the outer or main body of this invention, which main body is shown in section in FIG. 17. Since this is a left perspective view, the rear is shown open for the disposition of the expansion chamber. The main body as is known covers over the expansion chassis(es) and the interior walls.

Figure 19:
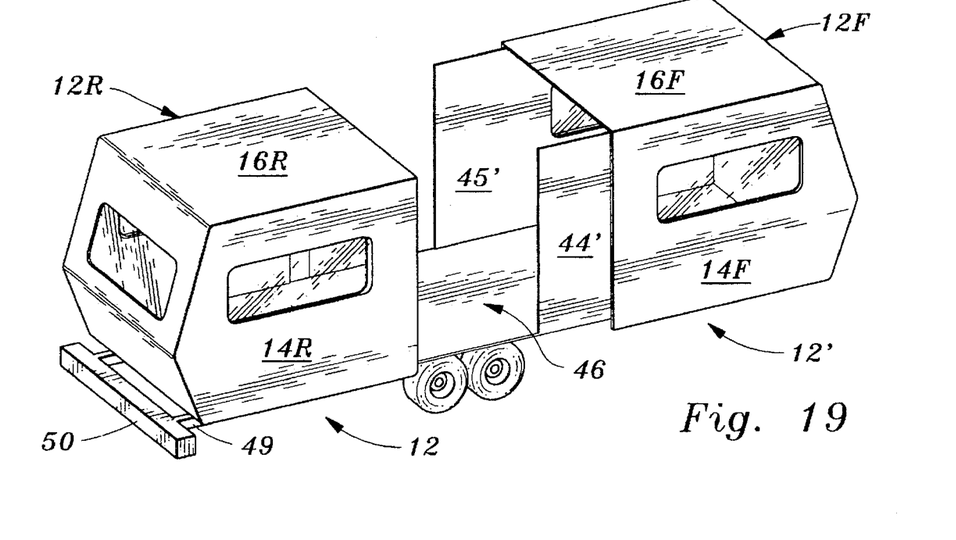
FIG. 19 is a top perspective view of a variant of the coach of this invention with the main shell removed from a coach having both a front and a rear expansion chamber.

FIG. 19 depicts a second embodiment of the invention, in that it is seen that the apparatus of this figure is designed to include two, not one expansion chambers. That is, the first or front expansion chamber moves forwardly, while the second or rear one moves rearwardly. The outer main body 11 of FIG. 18 is suitable for use with either the first or second embodiment of the invention. For those coaches with two expansion chambers, everything previously stated and to be stated about an expansion chamber for a single chamber coach suitably applies to each chamber of a dual expansion chamber coach. The only obvious difference is that such as alluded to earlier, a dual chamber coach is believed to be capable of existing only as a towable unit, and not as a self-powered one. The other minor difference is in the construction of the outer or main body 11. It would be open on both ends, and not have either a front or rear wall. Thus from the vantage point of FIG. 18, the main body as shown appears suitable for utilization in either embodiment.

Thus FIG. 19 is seen to disclose a coach whose outer body has been removed, and which has two expansion chambers; namely, 12 and 12'. These have respective top walls 16R and 16F and visible sidewalls 14R and 14F are visible here as well. Fixed inner walls 44 and 45, fixedly attached in conventional coach manufacturing fashion to the floor of the main body, and spaced from and adjacent to the disposition of the front expansion chamber's sidewalls 14F. Note also the alignment of the interior windows with the exterior windows, such that one does not readily recognize the presence of the specific expansion chamber be it front or rear disposed. The wheeled axles 29 disposed in their normal location beneath fixed floor 46 are also visible in this view.

Figure 20:
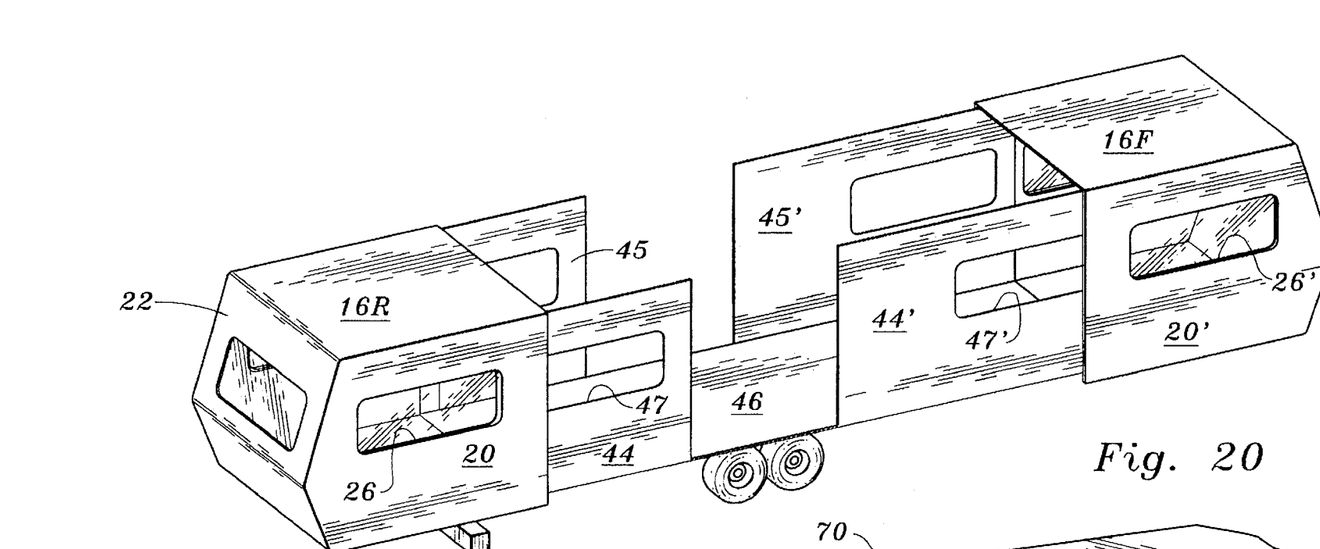
FIG. 20 illustrates a coach of this invention having both a front and a rear expansion chamber, both of which are in a partially expanded position.

FIG. 20 is related to FIGS. 14, 15, and 16. In those views the movement of only a rear expansion chamber is fixed in time. In this view, each of the two expansion chambers are seen fixed in time during the respective forwardly and rearwardly movement of said chamber. For ease of understanding the outer body shown in and discussed with respect to FIG. 18, has been removed.

Thus sidewalls 20 and 20' of the two expansion chambers each of which is connected to a top wall 16F and 16R respectively have their respective windows 26, 26' shown to be in vertical and horizontal dispositions such that when the expansion chamber is in a retracted position, the windows 20, 20' are in position alignment with rear inner window 45 and front inner window 47. Needless to say, the mechanism to extend and retract a front expansion chamber would be similar to that used to relocate a rear expansion chamber as discussed supra with respect to FIG. 24.

Figure 21:
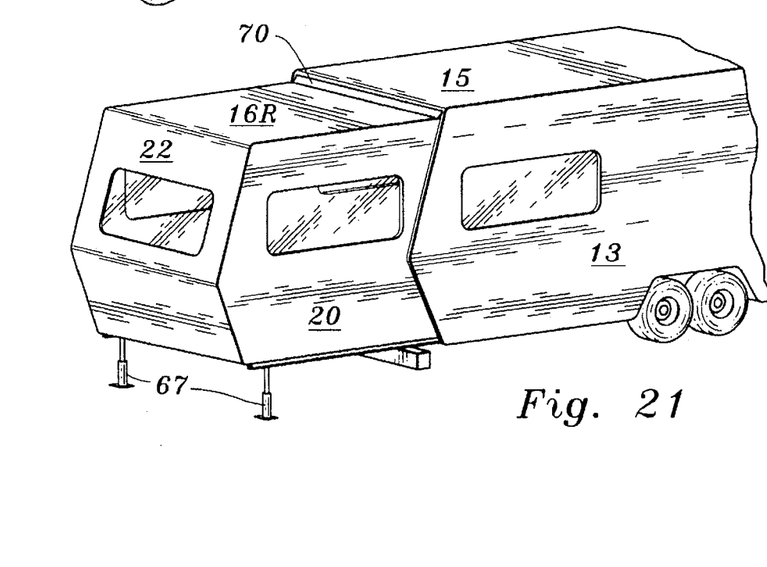
FIG. 21 is a close-up rear perspective view showing the rear chamber in a partially expanded disposition, but with the main shell in place.
Figure 25:
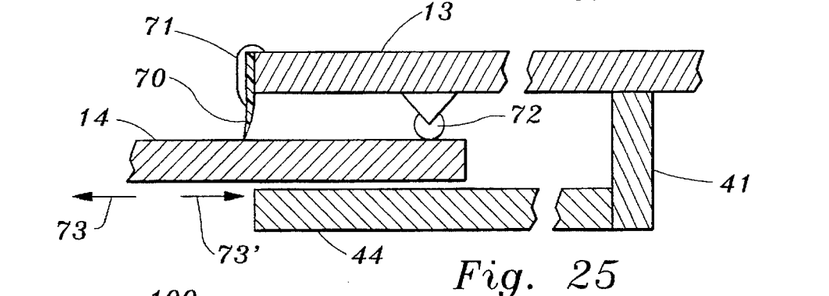
FIG. 25 is a diagrammatic top close-up view showing the relative positioning of the left sidewall of the expansion chamber as it moves from stowed to an expanded in-use position from between the interior and exterior walls of the main body of the coach.

FIG. 21 is a rear perspective view showing a rear expansion chamber in the outer position, but with the main body in its normally disposed position. Seal 70 is a rubberized flap that extends down from the top and around the two sides to form a seal to keep out water and wind. Reference is made to FIG. 25.

In FIG. 25, which is a diagrammatic top plan, the relative positioning of the main body's left side exterior wall 13 and interior wall, 44 and the expansion chamber's left sidewall 14 are shown. The flap 70, attached to the exterior wall of the main body, and which flap is made of a resilient polyurethane elastomer, much like a windshield wiper, acts as a seal to keep out air and moisture. The flap 70 is retained in place by a moulding strip 71 which serves also to smooth the corner of the main body.

While shown in this figure as being on the left side of the coach facing forward, it is to be understood by simple reference to FIG. 21 that the flap 70 extends over the top, down the right side of the coach, and optionally along the bottom of wall 14. An optional but recommended caster 72 installed near the upper edge of the inner side of the exterior wall of the main body, applies pressure to the expansion chamber sidewall 14, and prevents it from undergoing torque. Direction arrows 73, 73' indicate the bi-directional movement of the expansion chamber relative to the main body.

The right side of the interface between the expansion chamber's wall and the exterior and interior walls of the coach would be a mirror image of FIG. 25 but with different numbering. Thus reference is now made to the next figure, FIG. 26, which is a zoomed out diagrammatic top view showing the total coach without the roof and the expansion chamber in the outer in-use position.

Figure 22:
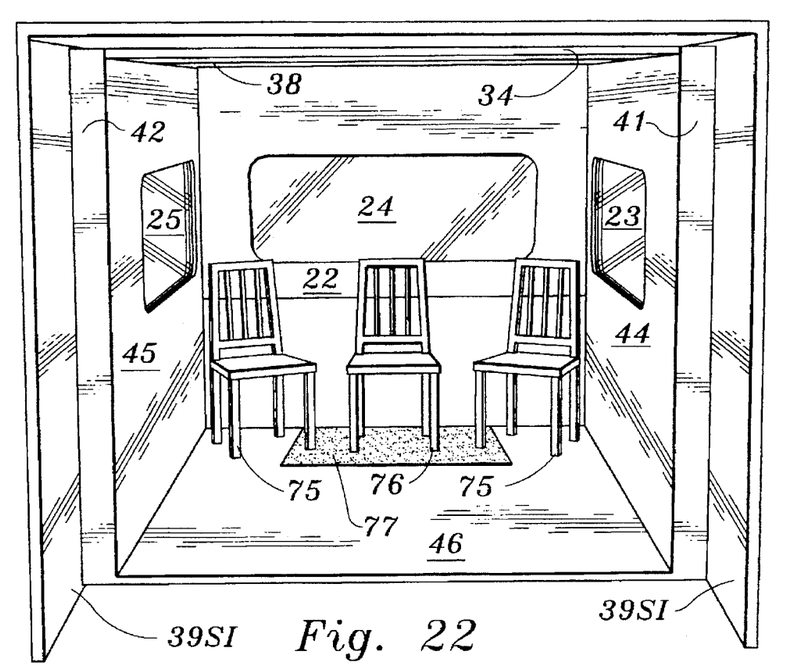
FIG. 22 is a perspective view which shows the interior of an expansion chamber in closed position with two chairs.
Figure 23:
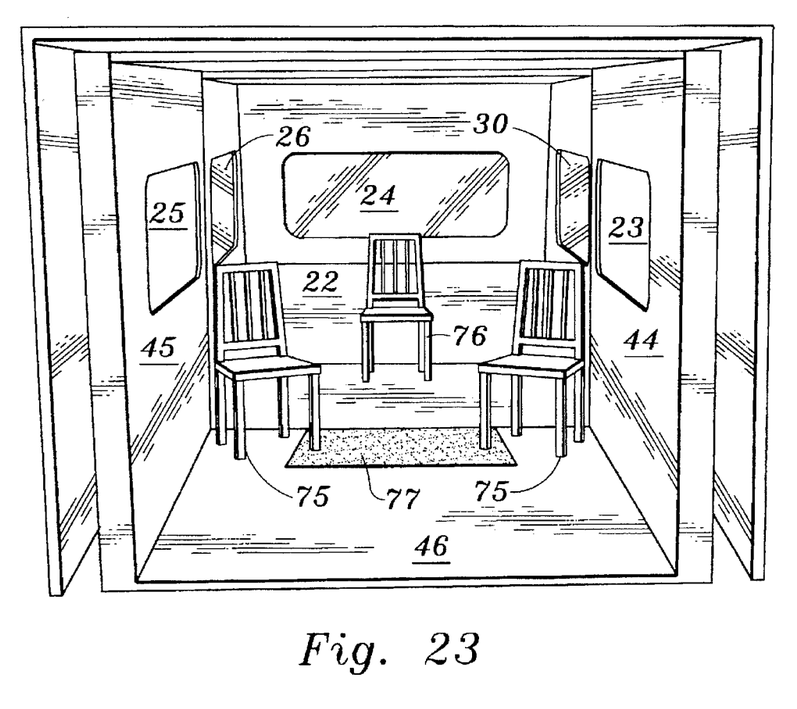
FIG. 23 is a perspective view which shows the interior of such expansion chamber in expanded position, with three chairs spaced from each other on the floor.
Figure 26:
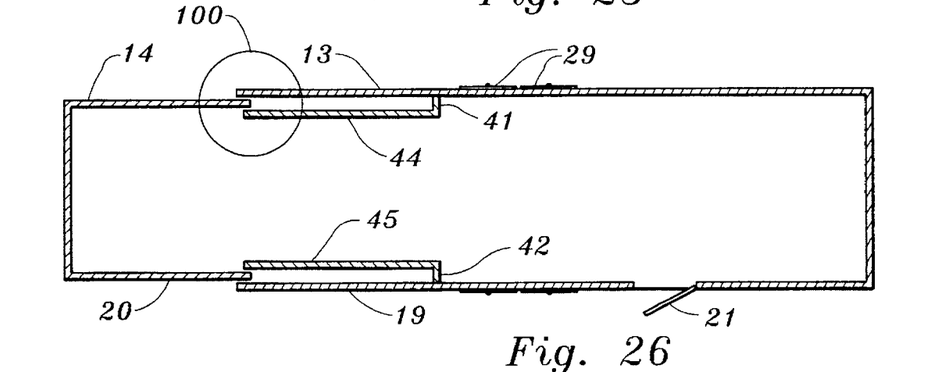
FIG. 26 is a top plan view diagrammatic view of a coach with a single rear expansion chamber in the outward position.

FIG. 26 is a diagrammatic representation of a coach with a rear expansion chamber moved fully rearwardly. Artistic license has been taken in this drawing, which shows no windows on each side of the coach, yet illustrates the point of discussion. The circled area 100 is the area shown in the previous figure. The wall segment 41, 42 that serves as a connector panel to connect the outer and inner walls of the main body, is as seen in FIGS. 22, 23, and 25. This segment is between four and six inches in width, just enough to accommodate the moving sidewall of the expansion chamber.

Having seen the relative positioning from the top and exterior, the reader is now invited inside to see the movement of the expansion chamber relative to the sidewalls of the main body. Reference is now made to FIGS. 22 and 23. These two views allow the reader to understand the location of the connector panels 41 and 42 and how they protrude into the living space of the coach. Note carefully the location of the chairs 75 and the throw rug 77. In FIG. 22 these three (3) pieces are shown adjacent to the rear wall 22. Now note FIG. 23, and the position of the third chair 76 spaced back from the two chairs 75, i.e., chair 76 being the only chair adjacent to the rear wall 22.

In FIG. 22 and 23 there are seen the wall segments 41 and 42 which connect the proximal end of the left and right main body inner walls to the outer walls, and which in turn form a stop for the inwardly movement of the expansion chamber 12's side walls. The proximal end of the inner walls is the end closer to the middle of the coach. These wall segments are lower in elevation as measured from the fixed base 46 upwardly, then is the elevation of the expansion chamber 12.

In order to prevent torque from twisting the inner walls 44, 45 of the main body per FIG. 17, wall segments 41, 42 are connected by brace 34 at the tops thereof. The relative position of the brace 34 atop the wall segments serves as a stop for the inward movement of the expansion chamber.

Seen also in FIG. 22 and 23 are roof trusses 38. These connect the exterior side walls of the main body, and as such may be part of the construction of element 15. Their relative disposition does not impair the inward and outward travel of the expansion chamber, as they are disposed above the wall 16, per FIG. 17.

Also visible in this contrast of outward and inward position are the extra windows of the expansion chamber. Reference is made to FIG. 15 for an exterior view of same.

While only a minimum amount of discussion has taken place with respect to the utilization of two expansion chambers, one at the forward end and one at the rearward end of the coach, in those coaches where two expansion units are employed the operation of a forward such unit would be the same as the operation of a rearward moving unit as has been described herein in detail.

The reader should also note that the expansion chamber concept of this application can be retrofitted to an existing motor coach. It is within the skill of the art to remove the rear wall, reinforce the balance of the coach, add a connector panel at a suitable location on each of the interior walls, and an accompanying interior wall to create the space to receive the sidewalls of the expansion chamber. The balance of the expansion chamber would nest into the main body of the coach in the manner previously described herein.

Previously I have described the use of the retention bar to maintain the deployable rails in their spaced parallel relationship for the in use position. A variant means to accomplish the same result, but with the elimination of the retention rail 51 and box tube 36T is shown in FIG. 27.

Figure 27:
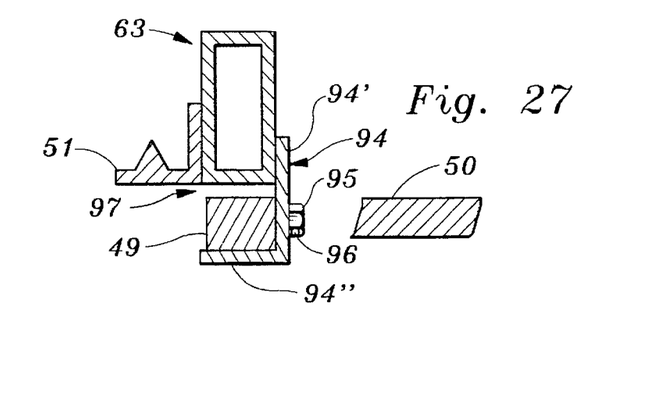
FIG. 27 is an elevational view depicting a variant means of retaining the deployable rails in their spaced deployed position.

In FIG. 27 there is shown a retention plate 94, which has a first vertical section 94' and a smaller horizontal section 94" at the lower end of said vertical section. The second section 94" extends outwardly from said first section when said first section is welded or otherwise connected to one of the two deployable rails 63. The attachment of the first section of the retention plate 94 is along the surface of the deployed rail 63, distant from the caster rail thereof, and spaced down along said surface a sufficient amount such that upon deployment of rail 63, the section 94" will be able to receive the bumper mount rail 49 within the defined space 97 between the lower surface of the deployed rail and the said plate 94". See FIG. 27. Retention plate 94 therefore serves as a vertical retainer to prevent the deployable rail 63 from being lifted upwardly relative to the bumper mount rail 49.

By providing a barrel bolt also called a sliding dead bolt 95 on the external surface of said retention plate 94, the pin 96 thereof, can be urged into a suitable pin receiver, (conventional) or aperture aligned with said pin on rear bumper 50. This dead bolt serves to retain the deployable rail in a fixed outward position for use.

The variant shown in FIG. 27 is advantageous in that it reduces weight, negates the requirement to lift and carry the retention bar, and is of lower cost than the retention bar.

The reader is urged to understand that the floor or fixed base 46, as seen in FIGS. 19 and 23, for example, is intended to fit flush to the interior surface of the outside walls of the body of the coach. There are no gaps between the edge of the base and the surface of normally disposed sidewall. This fact is mentioned because it is seen in FIG. 19 that the interior walls of the main body are sized from front to back to be equivalent in length to the length of the respective expansion chamber with a space in between. If as in the unit in FIG. 19 there are two expansion chambers, then the interior sidewalls of the coach may be so constructed to reduce the cost of manufacturing. That is, there is only an outer sidewall in the volume of the coach that has no expansion chamber in stowed position surrounding it, i.e., the middle.

Of course, it is also within the scope of the invention to utilize full length interior sidewalls to add extra sound insulation and to add to the strength of the overall construction.

It is seen that I have described a new coach, that can be expanded for use, to add extra living space, on demand. The apparatus can be used as a vehicle by having wheeled axles, or it can be placed on suitable stanchions, which are readily available in the marketplace for permanent placement at a fixed location. The apparatus as has been shown may include one or two expansion chambers. If the apparatus is a towed vehicle, then expansion chambers may be placed at the forward and at the rear ends thereof. If the coach is to be driveable by the inclusion of a cab and propulsion means, then only a rearwardly positioned expansion chamber may be incorporated into the coach.

When telescoping tubes or bars are employed for movement of an object from a first location to a second location it is important to ensure perfect alignment of one member with respect to the other, and it is important to keep the moving member lubricated to avoid "lock up", i.e., the failure of the moving member to move. Corrosion or dirt and any debris as may be located beneath a coach close to the ground could also inhibit movement of telescopic members. My deployable rail system avoids these problems.

The term living space as used herein is defined as the volume of the interior of the main body added to the volume of each of said expansion chambers when moved to its expanded in use position. It is to be noted that while the term expanded is used synonymously with "in-use", it is to be seen that the chamber can be utilized in its stowed position as well. This in-use really denotes primarily intended use.

I have indicated that the coach features a living space which has fixed upstanding inner sidewalls and a base, and which preferably has no closing wall at the front and/or rear position at which the respective chamber is disposed. It is also within the scope of the invention to provide a separator—interior wall at this location with a doorway therein, such that the expansion chamber assumes the appearance of a private room segregated from the rest of the coach.

I have at the same time described an expansion chamber which itself can be retrofitted to an existing coach by the carrying out of certain procedural steps, all of which are within the skill of the coach builder or repair person.

While I have disclosed a motor driven ram to operate the movement of the expansion chamber and have placed the controls on the exterior of the coach body, a hand crank could be substituted for a motor to move the expansion chamber. Similarly, if the unit is motorized, the controls could be placed on the inside of the coach at a convenient location.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. A coach, having an interior living space, which coach, when having a cab for controls for the operation of a propulsion system includes one expansion chamber and which coach when not having a cab and a propulsion system, has at least one and no more than two expansion chambers, which coach includes a main body having a top wall, and spaced left and right outer sidewalls, attached normal thereto; said main body also having spaced parallel fixed inner sidewalls each of which is spaced from its respective outer sidewall; and a fixed base, which fixed base is connected to said fixed inner sidewalls, each of said expansion chambers comprising a box open at one end and having a top wall, fixed to two side walls, a bottom wall and one closure wall fixedly connecting the top wall and the bottom wall, the location of the closure wall being dependent on the disposition of the expansion chamber relative to the main body, which expansion chamber if located in front of the main body has a front closure wall and if located to the rear of the main body has a rear closure wall, said expansion chamber being disposed intermediate the main body's outer and inner sidewalls, and beneath both of said top wall and said fixed base, said expansion chamber being movable in and out with respect to said main body in a telescopic manner, from between the main body's outer and inner sidewalls, and from beneath both of the top wall and fixed base;

the interior living space being defined as the volume of the interior of the main body added to the volume of each of said expansion chambers when moved to its in use position.

2. In the coach of claim 1 wherein each expansion chamber is moved from a stowed inner position to an in use outer position by an electronic means comprising a reversing switch actuated battery powered ram.

3. In the coach of claim 1 wherein each expansion chamber is moved from a stowed inner position to an in use outer position by a hand crank operated ram.

4. In the coach of claim 3 including means to prevent excessive outward movement of the expansion chamber relative to the main body.

5. In the coach of claim 1 wherein the outer sidewalls of the main body have an exterior side and an interior side and further including at least one caster mounted on the interior side of each outer sidewall and sized to permit the wheel thereof to roll on the adjacent respective sidewall of the expansion chamber.

6. In the coach of claim 1 wherein said coach includes a superstructure comprising two chassis, a main body chassis and an expansion chassis for each expansion chamber, and said main body chassis includes a deployable rail system.

7. In the coach of claim 6 wherein each expansion chamber moves from its first position to its second position on the deployable rail system.

8. In the coach of claim 7 wherein each expansion chamber moves from its first position to its second position on the deployable rail system on a plurality of V-groove casters rolling on inverted V-section caster rails of said deployable rail system.

9. In the coach of claim 6 wherein the main body chassis comprises a series of spaced crossmembers connected to spaced longitudinal side members, each of which side members carries at both the lead end and the tail thereof, an L-shaped caster rail carrier bracket extending outward from said respective side member, each caster rail carrier bracket retaining front fixed caster rails thereon, said main body chassis further including a deployable rail system.

10. In the coach of claim 9 wherein the deployable rail system comprises a pair of deployable rails, each of which has a distal and a proximal end and which is pivotally mounted at its proximal end to a main body chassis member and wherein each expansion chassis is carried by said main body chassis and is configured as a rectangle having front, rear and intermediate cross members connected to spaced longitudinal members, and wherein each of the longitudinal members has extending outwardly therefrom a caster carrier at both the forward and rearward ends of said expansion chassis.

11. In the coach of claim 10 wherein each deployable rail comprises a support bar with a caster rail mounted thereon, which-caster rail is adapted to linearly align with the fixed caster rail on the respective side of the main body chassis when the deployable rails are deployed.

12. In the coach of claim 11 further including means to support the caster rails when in the deployed position.

13. In the coach of claim 11 wherein each deployable rail is hingedly mounted at its proximal end to a main body chassis side member such that on deployment the caster rail of the deployable rail is linearly aligned with the front caster rail.

14. In the coach of claim 6 wherein the expansion chassis comprises a rectangle having front, rear and intermediate spaced cross members all connected to a pair of spaced longitudinal members;

each of said longitudinal members carrying at least two caster carriers, each of which caster carriers includes a caster disposed for movement on caster rails.

15. In the coach of claim 14 wherein the casters are V-groove casters, and the caster rails are inverted V-section rails.

16. In the coach of claim 1 wherein the proximal ends of each of the inner walls of the main body is connected to the respective outer wall by a connector panel wall segment to thereby define a pocket for receipt of said chamber's respective sidewall.

17. In the coach of claim 16 further including a brace interconnecting each of said wall segments along the tops thereof.

18. In the coach of claim 1 wherein at least one of the outer sidewalls of the main body includes a window, and the corresponding sidewall of an expansion chamber also includes a window, the window of said chamber being in spatial alignment with the window of said main body when the expansion chamber is in its stowed position such that light can enter the coach.

19. In the coach of claim 18 wherein the window of said main body and the window of said chamber that are in spatial alignment are dimensionally the same.

20. In the coach of claim 19 wherein both the left side and the right side of each of the main body's outer walls and of the chamber have windows in spatial alignment.

21. In the coach of claim 18 wherein there are two expansion chambers present, and at least one of the outer sidewalls of the front of the coach and at least one of the outer sidewalls of the rear of the coach, and the corresponding sidewall of both the front and rear expansion chambers each also include a window, the window of said chamber being in spatial alignment with the respective window of said main body when the expansion chamber is in its stowed position such that light can enter the coach.

22. A self-contained motorized coach having an interior living space, which coach, has a cab for controls for the operation of a propulsion system at the forward end of said coach, and which coach includes one expansion chamber at the rear thereof, which coach includes a main body having a top wall, and spaced left and right outer sidewalls, attached normal thereto; said main body also having spaced parallel fixed inner sidewalls each of which is spaced from its respective outer sidewall; and a fixed base, which fixed base is connected to said fixed inner sidewalls, the said expansion chamber comprising a box open at one end and having a top wall, two sidewalls, a bottom wall and a rear closure wall connecting the top wall, sidewalls, and the bottom wall, said expansion chamber being disposed intermediate the main body's outer and inner side walls, and beneath both of top wall and said fixed base, said expansion chamber being movable in and out with respect to said main body in a telescopic manner, from between the main body's outer and inner sidewalls, and from beneath both of the top wall and fixed base on a deployable rail system;

and a deployable rail system for the movement of said expansion chamber;

the interior living space being defined as the volume of the interior of the main body added to the volume of said expansion chamber when moved to its expanded in use position.

23. In the coach of claim 22 wherein at least one of the outer sidewalls of the main body includes a window, and the corresponding sidewall of the expansion chamber also includes a window, the window of said chamber being in spatial alignment with the window of said main body when the expansion chamber is in its stowed position such that light can enter the coach.

24. In the coach of claim 23 wherein the window of said main body and the window of said chamber that are in spatial alignment are dimensionally the same.

25. In the coach of claim 24 wherein both the left side and the right side of each of the main body's outer walls and of the expansion chamber, have windows in spatial alignment.

26. In the coach of claim 22 wherein said coach includes a superstructure comprising two chassis, a main body chassis and an expansion chassis, and said main body chassis includes a deployable rail system, and wherein the main body chassis comprises a series of spaced crossmembers connected to spaced longitudinal side members, each of which side members carries at both the lead end and the tail thereof, an L-shaped caster rail carrier bracket extending outward from said respective side member, each caster rail carrier bracket retaining front fixed caster rails thereon and further wherein the deployable rail system comprises a pair of deployable rails, each of which is pivotally mounted at its proximal end to a main body chassis member.

27. In the coach of claim 22 wherein the proximal ends of each of the inner walls of the main body is connected to the respective outer wall by a connector panel wall segment to thereby define a pocket for receipt of said chamber's respective sidewall and further including a brace interconnecting each of said wall segments along the tops thereof and means to prevent excessive outward movement of said expansion chamber relative to said main body.

28. A towable coach adapted to be pulled by a powered vehicle, said coach having an interior living space, which coach has at least one and no more than two expansion chambers, which coach includes a main body having a top wall, and spaced left and right outer sidewalls, attached normal thereto; said main body also having spaced parallel fixed inner sidewalls each of which is spaced from its respective outer sidewall; and a fixed base, which fixed base is connected to said fixed inner sidewalls, each of said expansion chambers comprising a box open at one end and having a top wall, fixed to two sidewalls, a bottom wall and one closure wall fixedly connecting the top wall, sidewalls and the bottom wall, the location of the closure wall being dependent on the disposition of the expansion chamber relative to the main body, which expansion chamber if located in front of the main body has a front closure wall and if located to the rear of the main body has a rear closure wall, each of said expansion chambers being disposed intermediate the main body's outer and inner sidewalls, and beneath both of said top wall and said fixed base, each of said expansion chambers being movable in and out with respect to said main body in a telescopic manner, from between the main body's outer and inner sidewalls, and from beneath both of the top wall and fixed base from a stowed position to an expanded position;

the interior living space being defined as the volume of the interior of the main body added to the volume of each of said expansion chambers when moved to its expanded position.

29. The towable coach of claim 28 wherein there is one expansion chamber and it is located at the rear of the main body.

30. In the coach of claim 28 wherein said coach includes a superstructure comprising two chassis, a main body chassis and an expansion chassis, and said main body chassis includes a deployable rail system and wherein the main body chassis comprises a series of spaced crossmembers connected to spaced longitudinal side members, each of which side members carries at both the lead end and the tail thereof, an L-shaped caster rail carrier bracket extending outward from said respective side member, each caster rail carrier bracket retaining front fixed caster rails thereon and further wherein the deployable rail system comprises a pair of deployable rails, each of which has a distal and a proximal end and which is pivotally mounted at its proximal end to a main body chassis member.

31. A towable coach adapted to be pulled by a powered vehicle, said coach having an interior living space, which coach has at least one and no more than two expansion chambers, which coach includes a main body having a top wall, and spaced left and right outer sidewalls, attached normal thereto; said main body also having spaced parallel fixed inner sidewalls each of which is spaced from its respective outer sidewall; and a fixed base; which fixed base is connected to said fixed inner sidewalls, each of said expansion chambers comprising a box open at one end and having a top wall, two sidewalls, a bottom wall and one closure wall connecting the top wall, sidewalls and the bottom wall, the location of the closure wall being dependent on the disposition of the expansion chamber relative to the main body, which expansion chamber if located in front of the main body has a front closure wall and if located to the rear of the main body has a rear closure wall, each of said expansion chambers being disposed intermediate the main body's outer and inner sidewalls, and beneath both of said top wall and said fixed base, each of said expansion chambers being movable in and out with respect to said main body in a telescopic manner, from between the main body's outer and inner sidewalls, and from beneath both of the top wall and fixed base from a stowed position to an expanded position;

the interior living space being defined as the volume of the interior of the main body added to the volume of each of said expansion chambers when moved to its expanded position and further wherein the proximal ends of each of the inner walls of the main body is connected to the respective outer wall by a connector panel wall segment to thereby define a pocket for receipt of said chamber's respective sidewall and further including a brace interconnecting each of said wall segments along the tops thereof and means to prevent excessive outward movement of said expansion chamber relative to said main body.

32. An expansion chamber for retrofit onto a preexisting coach having inner and outer sidewalls, at least one end wall, a top wall and a base, upon removal of an end wall of said coach, said expansion chamber comprising a box open at one end and having a top wall fixed to, two sidewalls, a bottom wall and one closure wall fixedly connecting the top wall, sidewalls, and the bottom wall, the location of the closure wall being dependent on the disposition of the expansion chamber relative to the preexisting coach, said chamber being adapted for disposition intermediate a coach's outer and inner sidewalls, and beneath both of the top wall and the base of said coach;

said chamber being further adapted for movement in and out with respect to said coach in a telescopic manner from between the coach's outer and inner sidewalls and from beneath both of the top wall and said base.

33. The expansion chamber of claim 32 wherein said chamber has a chassis having a plurality of casters thereon adapted for movement on a caster rail system.

34. A superstructure for a coach, having a main body, which coach, when having a cab for controls for the operation of a propulsion system includes one expansion chamber and which coach when not having a cab and a propulsion system, has at least one and no more than two expansion chambers, each chamber being adapted for movement away from said main body, which superstructure includes a main body chassis for the main body and at least one expansion chassis for a respective expansion chamber, wherein the main body chassis comprises a series of spaced crossmembers connected to spaced longitudinal side members, each of which side members carries at both the lead end and the tail thereof, an L-shaped caster rail carrier bracket extending outward from said respective side member, each caster rail carrier bracket retaining front fixed caster rails thereon and said main chassis also includes a deployable rail system which comprises a pair of deployable rails, each of which has a distal and a proximal end and which is pivotally mounted at its proximal end to a main body chassis member.

35. In the superstructure of claim 34 wherein the coach has one expansion chamber and the superstructure includes a main body chassis and one expansion chassis.

36. In the superstructure of claim 34 wherein each deployable rail comprises a support bar with a caster rail mounted thereon, which caster rail is adapted to linearly align with the fixed caster rail on the respective side of the main body chassis when the deployable rails are deployed.

37. In the superstructure of claim 34 wherein there is a single expansion chassis, and said chassis is disposed for movement rearwardly from said main chassis.

38. In the superstructure of claim 34 wherein there are two expansion chassis, and wherein one of said expansion chassis is disposed for movement forwardly from said main chassis, and the other expansion chassis is disposed for movement rearwardly from said main chassis.

39. In the superstructure of claim 34 wherein each expansion chassis is carried by said main body chassis and is configured as a rectangle having front, rear and intermediate cross members connected to spaced longitudinal members, and wherein each of the longitudinal members has extending outwardly therefrom a caster carrier at both the forward and rearward ends of said chassis.

40. In the superstructure of claim 39 wherein each of the four caster carriers each carry a single V-groove caster, adapted to engage the caster rails.

41. A superstructure for a self-contained motorized coach having a main body, and which coach, has a cab for controls for the operation of a propulsion system at the forward end of said coach, and which coach includes one expansion chamber at the rear thereof adapted for movement away from said main body, which superstructure includes a main body chassis for the main body and an expansion chassis for an expansion chamber, wherein the main body chassis comprises a series of spaced crossmembers connected to spaced longitudinal side members, each of which side members carries at both the lead end and the tail thereof, an L-shaped caster rail carrier bracket extending outward from said respective side member, each caster rail carrier bracket retaining front fixed caster rails thereon and said main chassis also includes a deployable rail system which comprises a pair of deployable rails, each of which has a distal and a proximal end and which is pivotally mounted at its proximal end to a main body chassis member;

and wherein the expansion chassis is carried by said main body chassis and is configured as a rectangle having front, rear and intermediate cross members connected to spaced longitudinal members, and wherein each of the longitudinal members has extending outwardly therefrom a caster carrier at both the forward and rearward ends of said chassis.

42. In the superstructure of claim 41 wherein each deployable rail comprises a support bar with a caster rail mounted thereon, which caster rail is adapted to linearly align with the fixed caster rail on the respective side of the main body chassis when the deployable rails are deployed.

* * * * *